USO05609829A

United States Patent [19]
Lucas et al.

[11] Patent Number: 5,609,829
[45] Date of Patent: Mar. 11, 1997

[54] CATALYTIC/THERMAL CONVERTOR UNIT

[75] Inventors: Walter P. Lucas, Bolton; Raymond Hsu, Richmond Hill, both of Canada

[73] Assignee: Comenco Systems Inc., Mississauga, Canada

[21] Appl. No.: 325,581

[22] Filed: Oct. 19, 1994

Related U.S. Application Data

[62] Division of Ser. No. 54,453, Apr. 27, 1993, abandoned.

[51] Int. Cl.⁶ .................... G05D 7/00; F23D 14/00; F23G 7/06
[52] U.S. Cl. ............... 422/110; 422/119; 422/171; 422/177; 422/900; 431/5; 431/202
[58] Field of Search ................ 431/5, 202; 110/210, 110/211, 212; 422/110, 119, 171, 177, 900; 435/266, 4

[56] References Cited

U.S. PATENT DOCUMENTS

| | | | |
|---|---|---|---|
| 3,645,846 | 2/1972 | Imada et al. | 435/3 |
| 3,898,040 | 8/1975 | Tabak | 422/171 |
| 4,101,632 | 7/1978 | Lamberti et al. | 431/5 |
| 4,418,045 | 11/1983 | Sato et al. | 423/245.3 |
| 4,444,735 | 4/1984 | Birmingham et al. | 431/5 |
| 4,565,679 | 1/1986 | Michalak et al. | 422/110 |
| 4,900,244 | 2/1990 | Keller et al. | 431/5 |
| 4,983,364 | 1/1991 | Buck et al. | 422/189 |
| 4,985,211 | 1/1991 | Akiyama et al. | 423/245.3 |
| 5,078,973 | 1/1992 | Kuroda et al. | 422/170 |
| 5,118,629 | 6/1992 | Quiros et al. | 422/62 |
| 5,211,925 | 5/1993 | Houston | 423/235 |
| 5,266,274 | 11/1993 | Taggart et al. | 422/110 |
| 5,291,859 | 3/1994 | Brinck et al. | 110/212 |

Primary Examiner—Robert J. Warden
Assistant Examiner—Theresa T. Snider
Attorney, Agent, or Firm—Barry R. Lipsitz

[57] ABSTRACT

An oxidation or converter apparatus for cleansing air contaminated by volatile organic compounds (VOC) in an exothermic reaction includes a first pipe connectible to a source of the VOC contaminated air and a combustion chamber with a burner, an inlet for the VOC contaminated air and an outlet to atmosphere for exhaust, the inlet being connected to the first pipe. A catalytic oxidizer having an inlet for the VOC contaminated air and an outlet to atmosphere for exhaust is also provided along with an air-to-air heat exchanger. The outlet of the catalytic oxidizer is connected to a first inlet of the heat exchanger in order to provide heated exhaust air to one side of the exchanger. A second inlet of the heat exchanger is connected by a suitable conduit to the first pipe. The contaminated air which is preheated in the heat exchanger is carried by a further conduit to the inlet of the combustion chamber. After being further heated in the combustion chamber, it passes along an additional conduit to the inlet of the oxidizer. By the selective use of bypass valves, the unit can operate in either a thermal mode or a catalytic mode.

13 Claims, 7 Drawing Sheets

CATALYTIC/THERMAL CONVERTOR UNIT

This application is a divisional of U.S. patent application Ser. No. 08/054,453 filed on Apr. 27, 1993, now abandoned.

BACKGROUND OF THE INVENTION

This invention relates to oxidation or converter apparatus for removing volatile organic compounds from an air stream.

An increasing problem encountered by industry, and particularly fuel supply companies, is the contamination of the air by volatile organic compounds (VOC). Frequently contamination problems are encountered due to accidental spilling of these compounds onto the ground or by leakage from equipment or storage facilities, typically underground tanks in which these compounds are stored. Because of increasing environmental concerns, governments have been imposing stricter standards on industry both to prevent the contamination of the environment, including the ground, and to require a thorough clean up of any contamination that occurs. In order to determine the extent of ground contamination, test bores can be drilled into the affected front. Once the extent of contamination has been determined, there are several known methods of removing the contamination. The commonly used methods have some drawbacks. One way for soil remediation is to excavate the contaminated soil and dispose of it in an approved hazardous solid waste dump site but the cost of this solution is very high. Furthermore, there can be a revenue loss to the property owner due to the need to shut down the facility in question during excavation.

Another method to remove contamination from soil is to use a vapor extraction system. This requires bore holes to be formed in the contaminated ground so as to permit air ladened with volatile organic compound (VOC) to be collected. In this method, underground interconnecting PVC pipes and vacuum pumps can employed to collect the contaminated air, which air is then pumped through an activated carbon adsorption bed, a thermal converter or a catalytic converter. The use of an activated carbon adsorption system has distinct disadvantages from the standpoint of the carbon and the need to dispose of contaminated carbon at an approved solid waste dump site. An expensive monitoring service may be required to collect monitoring data for evaluation in order to comply with environmental standards.

The problem with using only a thermal converter to cleanse the contaminated air is the high cost due to high energy consumption and the need for a monitoring service. The latter is required to collect monitoring data for evaluation to comply with environmental standards. Energy costs can be high because of the need to supply a relatively expensive, clean burning fuel to the combustion chamber when the volatile organic compounds in the contaminated air falls below a certain level. A catalytic converter suffers from the difficulty that it is not suitable where the contaminated air contains high levels of VOC compounds, that is, where the low explosive limit (LEL) of the contaminated air is too high.

U.S. Pat. No. 4,983,364 issued Jan. 8, 1991 to F. A. Buck et al describes a combination thermal/catalytic combustor for the oxidation of VOC compounds in air, which apparatus is said to be suitable for cleaning up ground sites contaminated by spills or leaks. A thermal combustor and a catalytic oxidizer are interconnected by piping and control valves and when one operates, the other does not. The selection depends on the concentration of combustible vapors in the air. This patent specification also teaches the use of a dilution air valve, a heat exchanger, and an electric heater to improve the efficiency of the system. The heat exchanger is heated on one side by exhaust air exiting from the outlet of the catalytic oxidizer. This known multi-mode combustor has several disadvantages including the need for extensive monitoring on site and manual operation of many of the valves in the piping system. Also the use of an electric heater for heating the air entering the catalytic converter can increase substantially the cost of operation of this combuster.

The present invention provides an improved oxidation or converter apparatus for cleansing air contaminated by VOC compounds by means of an exothermic reaction. The apparatus can employ both a combustion chamber with a burner and a catalytic oxidizer, both having inlets for VOC contaminated air and outlets to atmosphere for exhaust air that can include carbon dioxide and water. Advantageous features that can be employed in the oxidation apparatus described herein include piping means for routing the VOC contaminated air through the combustion chamber in order to heat same before it reaches the catalytic oxidizer and a heat exchanger which can also be used to heat the VOC contaminated air before it reaches the combustion chamber and then the catalytic oxidizer. Further advantageous features disclosed herein include a special condensation tank for removing condensation or water vapor from the VOC contaminated air as it enters the converter system and a mechanism for introducing a selected amount of fresh air into the entry pipe so that the fresh air is mixed with the VOC contaminated air. The damper mechanism for controlling the entry of fresh air is operated by an electrical control which includes means for measuring the low explosive limit (LEL) of the VOC contaminated air in the entry pipe.

SUMMARY OF THE INVENTION

According to one aspect of the invention an oxidation apparatus for cleansing air contaminated by volatile organic compounds (VOC) in an exothermic reaction includes piping means connectible to a source of VOC contaminated air, a burner, a combustion chamber having an inlet for the VOC contaminated air and an outlet to atmosphere for exhaust including carbon dioxide and water vapor. There is also provided a catalytic oxidizer having an inlet for the VOC contaminated air and an outlet to atmosphere for exhaust including carbon dioxide and water. A conduit is adapted for connection to both the combustion chamber and the catalytic oxidizer for conducting heated VOC contaminated air from the combustion chamber to the catalytic oxidizer when the apparatus is operating in a catalytic mode. The piping means is coupled to the inlet of the combustion chamber.

According to another aspect of the invention, an oxidation apparatus for cleansing air contaminated by VOC compounds by means of an exothermic reaction includes a pipe connectible to a source of air contaminated by VOC of varying concentrations and a combustion chamber having an inlet for the VOC contaminated air and an outlet to atmosphere for exhaust. A burner is mounted in or to the combustion chamber and the pipe is joined to the inlet of this chamber. The apparatus includes a tank device for removing condensation or water vapor from the VOC contaminated air. The pipe is connected to the tank device in such a manner whereby the VOC contaminated air as it enters the tank device is forced to swirl around the inside of a cylindrical side wall of the tank device, the swirling action causing water and water vapor to collect on the side wall and settle to the bottom of the tank device.

In the further embodiment of the invention, the oxidation apparatus in addition to having the aforementioned pipe and combustion chamber has an air-to-air heat exchanger connected by a first conduit to a source of heated air. The heat exchanger has first and second air inlets, first and second air outlets and first and second sets of air passageways connecting respectively the first inlet and outlet and the second inlet and outlet. The first conduit extends to the first inlet of the heat exchanger. The pipe system includes first and second pipe path sections and valves for selecting either of the pipe path sections for use. The first pipe path section conducts the VOC contaminated air directly to the combustion chamber while the second pipe path section conducts the contaminated air to the second air inlet of the heat exchanger where the VOC contaminated air can be preheated. The pipe system includes a second conduit extending from the second air outlet to the combustion chamber.

Preferably, the aforementioned source of heated air is a catalytic oxidizer having an outlet connected to the first conduit and an inlet for receiving VOC contaminated air.

According to still another aspect of the invention, an oxidation apparatus for cleansing air contaminated by VOC compounds in an exothermic reaction includes a piping system connectible to a source of VOC contaminated air and a device for oxidizing the volatile organic compounds with an exothermic reaction in order to remove same from the VOC contaminated air. The oxidizing device has an inlet connected to the piping system and an outlet for exhaust air. There is also a mechanism for introducing a selected amount of fresh air into the piping system so the fresh air is mixed with the VOC contaminated air flowing through the piping system. An instrument is provided to measure the low explosive limit (LEL) of the VOC contaminated air flowing through the piping system and it produces an electrical signal indicative thereof. There is also an electrical control mechanism for controlling the fresh air introducing mechanism on the basis of the electrical signal, this control mechanism being electrically connected to both the measuring instrument and the fresh air introducing mechanism.

A flame arrestor can be mounted in the piping system to prevent any flame from the combustion chamber being blown back through the piping system where it could damage instruments or equipment.

Further features and advantages will become apparent from the following detailed description taken in conjunction with the accompanying drawings.

DETAILED DESCRIPTION OF PREFERRED EMBODIMENT

Figure 1:
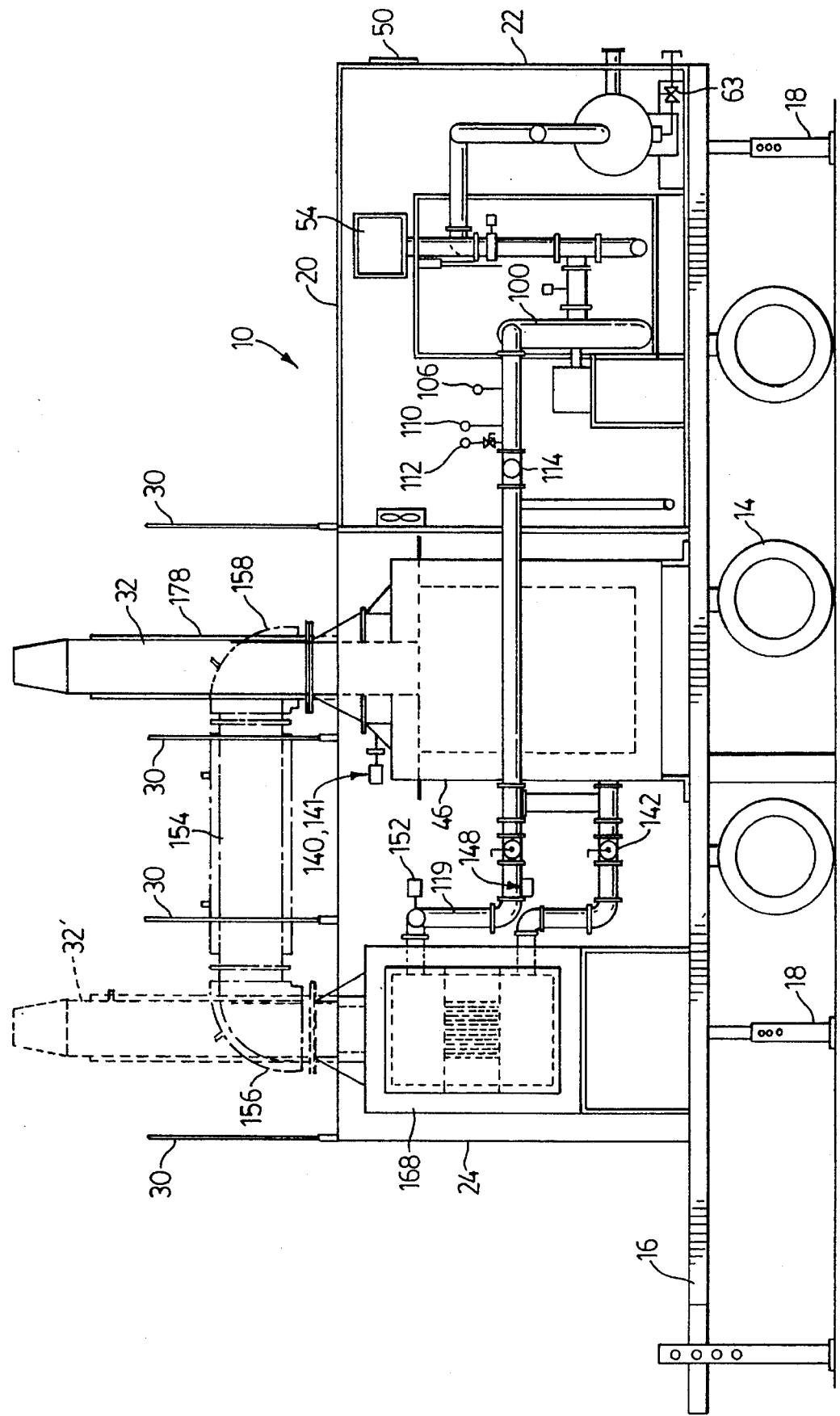
FIG. 1 is a side elevation of a converter unit constructed in accordance with the invention, said unit being mounted on a tractor trailer and being shown with side panels removed for sake of illustration.
Figure 2:
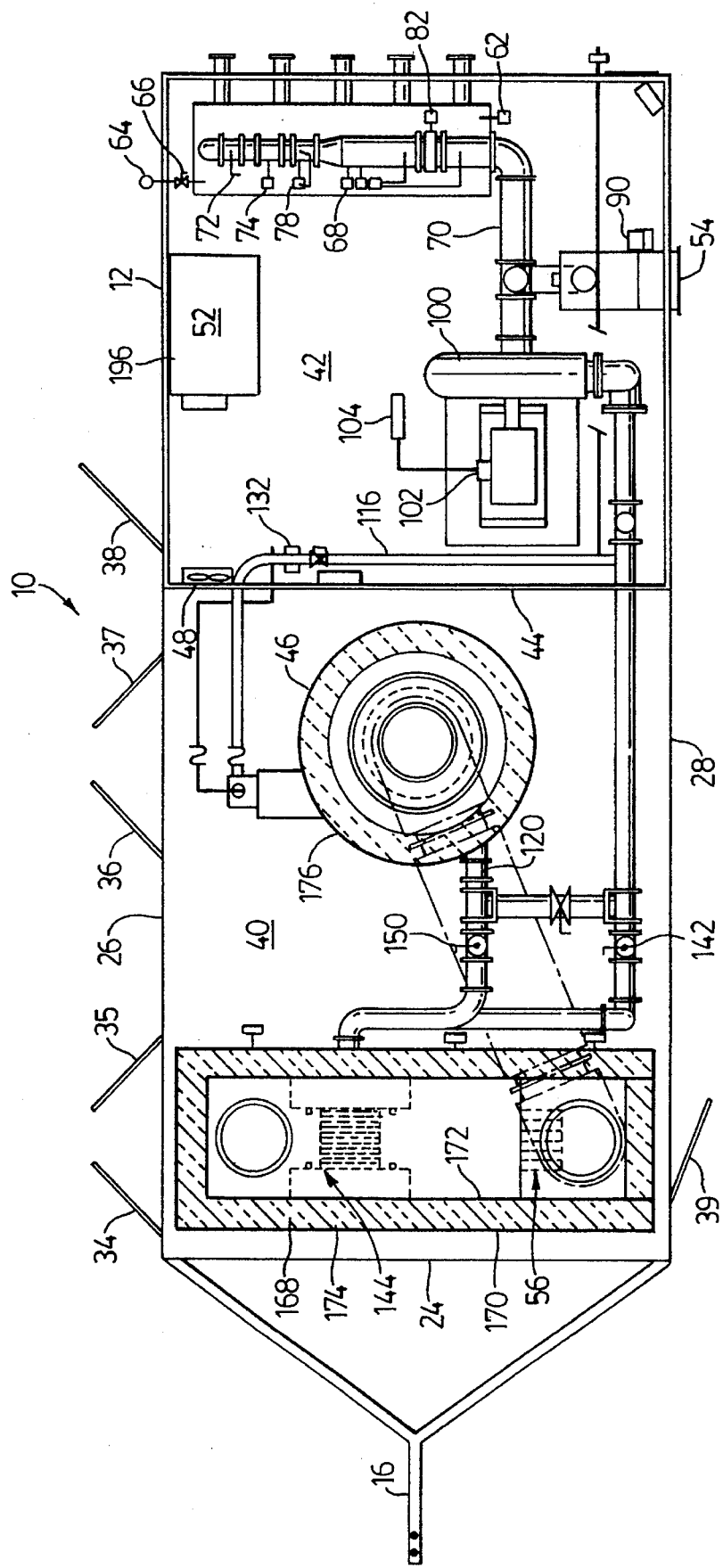
FIG. 2 is a plan view of the converter unit of FIG. 1 with the top of the trailer removed and some parts shown in cross section for sake of illustration.

FIGS. 1 and 2 illustrate the general arrangement of an oxidation apparatus or a converter unit 10 for cleansing air contaminated by volatile organic compounds, hereinafter referred to as VOC by means of an exothermic reaction. Such compounds include gasoline and diesel fuel. The preferred unit 10 is mounted in a truck trailer 12 having wheels 14 and a foldable front tongue 16 for pulling. In order that the trailer unit will have firm and rigid support for operation of the equipment, four portable and adjustable jacks 18 can be provided and these are arranged at the four corners of the trailer when it has reached an operational site. In order to enclose and protect the equipment of the converter unit, the trailer is provided with a top 20, a rear wall 22, a front wall 24 and longitudinally extending side walls 26 and 28. When the trailer has reached its operational site, a safety railing 30 can be erected on the top of the trailer and it will be understood that this railing extends all around the area in which an exhaust stack 32 can be mounted. Only the upright posts of this railing have been shown in FIG. 1 for sake of illustration but it will be understood that the railing includes horizontally extending rail members supported by the posts. Shown in FIG. 2 are a number of doors or shutters 34 to 39 providing necessary access to the interior of the trailer and the equipment mounted therein.

The trailer 12 is preferably divided into two principal sections 40 and 42 by means of an insulated interior wall 44. Preferably it is a solid metal wall with at least one inch of insulation. The larger section 40 in front of the wall houses a combustion chamber 46. Because of the heat generated in this section, it is preferable for the side walls 26 and 28 of the section 40 and the front wall 24 to be made of a series of expanded metal screens, thus allowing plenty of ventilation for this section while still protecting the equipment therein. The exterior side walls of the section 42 can be made of solid metal sheets in the usual manner. Mounted in the wall 44 is a ventilation fan 48. An exhaust louver 50 can be mounted in the rear wall so that air can circulate through section 42. Also shown in FIG. 2 is a control panel 52 from which the converter unit can be operated. This panel contains a programmable logic controller 196. Also, mounted in the side wall 28 is a fresh air inlet 54 which can be covered with a suitable screen. This inlet permits fresh air to be introduced into the intake pipe system of the converter unit as explained hereinafter.

Figure 3:
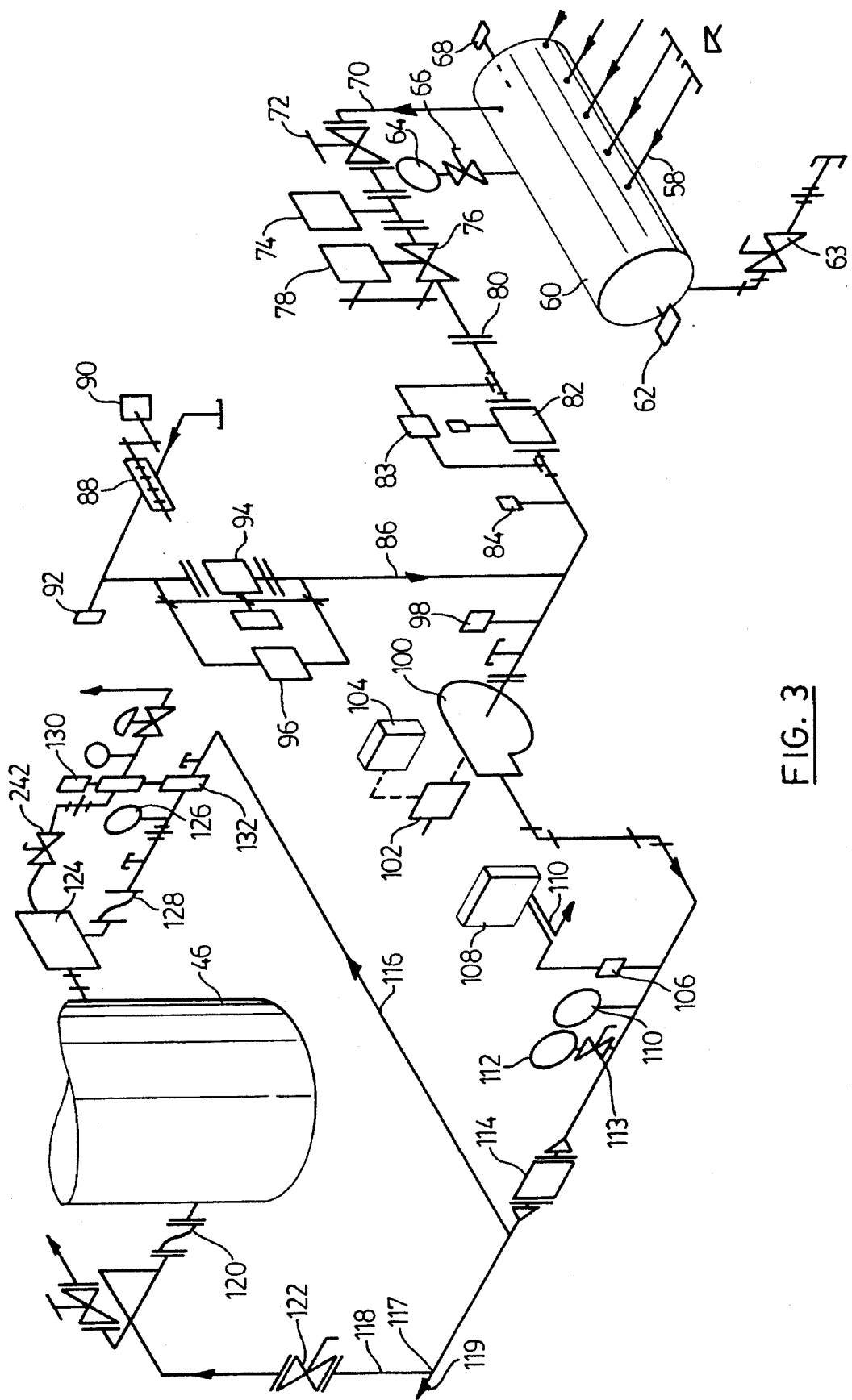
FIG. 3 is a system schematic diagram showing the piping system and components mounted therein for feeding VOC contaminated air to a combustion chamber.

Reference will now be made to FIG. 3 which shows schematically the piping, sensors and other equipment used to feed VOC contaminated air to either the combustion chamber 46 or a catalytic oxidizer 56 (see FIG. 2). The oxidation apparatus can be fed by a number of individual vapor extraction pumps which can be of standard construction and operation. In the system of FIG. 3, there are five such pumps feeding VOC contaminated air through five horizontally extending inlet pipes 58. These pipes are connected to the side of a cylindrical tank 60 which is used for removing condensation or water vapor from the VOC contaminated air. The construction of this tank and its operation will be described later in conjunction with FIGS. 7 and 8 of the drawings. At one end of the tank there is mounted a level switch 62 which is used to indicate to the operator the amount of condensation collected in the tank. Also mounted on one side of the tank is an air pressure gauge 64 connected by means of gauge cock 66. There is also mounted on the side of the tank a temperature sensor 68 for measuring the temperature of the air inside the tank. Extending from the tank (see FIGS. 2, 3, 7 and 8) is a piping means indicated generally at 70. This piping means is connected to an inlet of the combustion chamber 46. The pipe first extends to a manual valve 72 and then to an automatic safety shut-off valve 74. Next along the pipe is a vapor control valve 76 which is provided with a modulation motor 78 and electrical interlocks for monitoring purposes. Next along the pipe is a reducing flange 80 wherein the diameter of the pipe is expanded from four inches to six inches in the preferred embodiment. The pipe then extends to a solvent air flow rate measuring orifice 82 equipped with electrical transmitter 83 that transmits an electrical signal indicative of the air flow rate to the programmable logic controller (hereinafter referred to as the PLC) in control panel 52. Continuing downstream there is a first low explosive limit (LEL) measuring device 84. This device measures the LEL of the VOC contaminated air flowing through the pipe. In a preferred embodiment this sensor cell produces an electrical output signal of 4 to 20 ma. It can be an explosion proof cell such as that manufactured and sold by Analygas System. This sensor is connected by suitable wiring to the PLC. Connected downstream of the sensor 84 is a branch pipe 86 by which fresh air can be introduced into the pipe 70 and mixed with the VOC contaminated air. Pipe 86 extends to a fresh air flow control damper 88 which is operated by its modulation motor 90 equipped with electrical interlock for monitoring purposes. This motor is connected to and operated by the PLC. A temperature sensor 92 is connected to the fresh air pipe and it is able to send an electrical signal indicative of the temperature to the PLC control for the system. Also mounted in pipe 86 is a fresh air flow measuring instrument 94 which is equipped with a transmitter 96 that provides an electrical signal indicative of the rate of air flow to the PLC. It will be understood that the air flow measurers 82 and 94 per se are of standard construction and therefore a detailed description herein is deemed unnecessary. Continuing along the pipe 70 there is provided a suction pressure sensor and electrical transmitter at 98 and then a booster blower 100 with a capacity of 500 standard cubic feet per minute (SCFM). This blower, which can be of standard construction, has a variable speed drive motor and is provided to automatically adjust the system to the number of vacuum pumps in operation thereby minimizing energy consumption. Connected to the motor is a variable frequency drive unit 104 which acts to maintain a constant volume airflow through the pipe 70.

Downstream from the blower is a second LEL sensor 106 which is electrically connected to LEL monitor 108. The arrow at 110 indicates that the monitor 108 is also connected to the first LEL sensor 84. The monitor can be a two channel type of known construction, such as that sold by Analygas System. Continuing along the pipe 70 there is an air pressure switch 110 which is used to switch off the system if the fan or blower is not running. Downstream of this switch is a further air pressure gauge 112 connected to the pipe by means of gauge cock 113.

Downstream of this gauge is a flame arrestor 114 which per se can be of standard construction. The arrestor is provided downstream from the blower to protect upstream components from flashback. Thus, any flame running through the pipe from the combustion chamber 46 will not pass by the arrestor. A suitable flame arrestor is that available from NAO Inc. of Philadelphia, U.S.A.

After the flame arrestor, the pipe 70 meets a branch pipe 116, the purpose of which will be described hereinafter. This can be a smaller 2 inch diameter pipe. The main four inch diameter pipe 70 continues to another junction at 117 where it divides into first and second pipe path sections 118 and 119. The first pipe path section 118 is used in a thermal mode of operation and conducts the VOC contaminated air directly to the thermal combustion chamber 46 via a flexible hose connector 120. Mounted in the section 118 of the pipe is first by-pass valve 122 which is opened for the thermal mode of operation of the unit and closed for the catalytic mode of operation.

Figure 4:
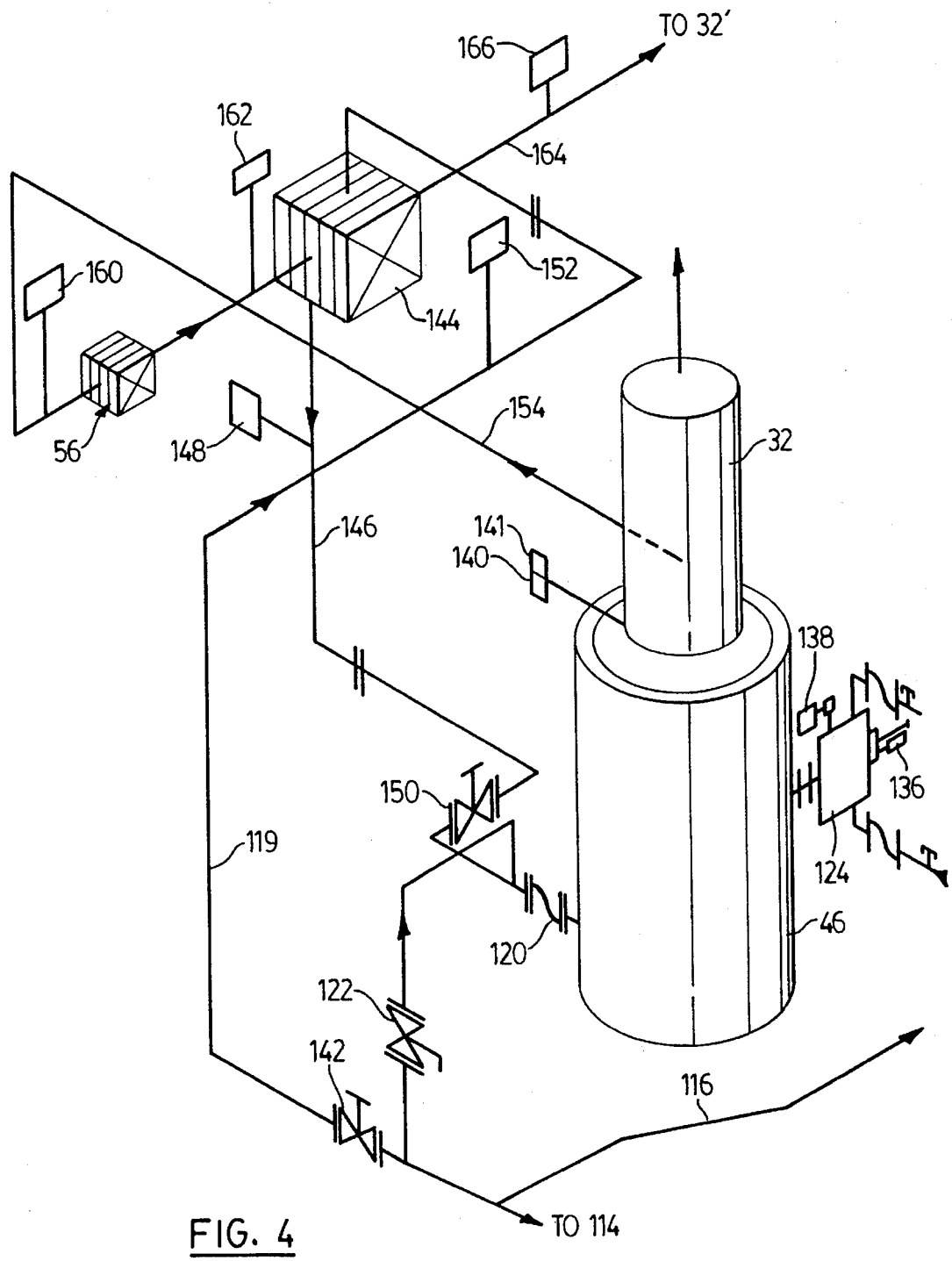
FIG. 4 is another system schematic diagram which shows the conduit connecting the combustion chamber, the catalytic oxidizer and the heat exchanger of the converter unit and which, taken in conjunction with FIG. 3, shows the complete system for the converter unit.

The aforementioned pipe 116 extends to a burner 124 which is connected to the base of the combustion chamber. It can be a standard nozzle mix type allowing vapor, nature gas/propane and air to be fired on a predetermined ratio. The required combustion air for the burner is fed through pipe 116. A suitable burner is a Maxon 2" Kimemax medium velocity burner. Mounted in the line 116 is a pressure switch 126 which will switch off the system if there is inadequate pressure in the line and a flexible hose connection 128. In order to control the flow of the VOC contaminated air through the line 116 there is a modulation motor 130. This motor operates a control valve 132 mounted in line 116. As shown in FIG. 4, the burner 124 may be provided with a UV scanner 136, which scanners are available from Honeywell. Also connected to the burner is an ignition transformer 138 converting 120 volts to 15,000 volts. A suitable transformer is available from Honeywell.

Turning now to the features illustrated in FIG. 4, mounted at the top of the combustion cheer are two thermal couples 140, 141, the first used to control the temperature in the combustion chamber during the thermal mode of operation so that it is maintained at about 1,600 degrees F., and the second being a high temperature cut-out device to cut-out the burner if the temperature exceeds a selected design limit. Mounted in pipe path section 119 is a second by-pass valve 142 which is open during the catalytic mode of operation and closed for the thermal mode. The line 119 which can be a four inch diameter pipe extends to one of two inlets of an air-to-air heat exchanger 144. The heat exchanger 144 can be a standard cross flow plate type heat exchanger made of stainless steel and having a capacity, in one preferred embodiment, of 500 SCFM. In this heat exchanger the VOC contaminated air is preheated and then it exits through an outlet of the heat exchanger and through conduit 146. The temperature of the gas leaving the heat exchanger is monitored by temperature sensor 148. In the conduit 146 is a third by-pass valve 150 which is open for catalytic mode of operation and closed for the thermal mode. The temperature of the air entering the heat exchanger can also be monitored by means of temperature sensor 152 mounted in pipe path section 119.

The preheated VOC contaminated air is further heated in the combustion chamber 46 in the catalytic mode of operation and then it exits through the outlet in the top of the combustion chamber through pipe conduit 154. This conduit which in a preferred embodiment is insulated and has a diameter of 18" can be made of 18 gauge stainless steel. It has 90 degree elbows 156 and 158 arranged at either end as shown in FIG. 1 and at least the elbow 158 is removable in order to allow the exhaust stack 32 to be connected to the top of the combustion chamber for the thermal mode of operation. It will be understood that the pipe conduit 154 is only used during the catalytic mode of operation. Conduit 154 delivers the fully heated VOC contaminated air to the catalytic oxidizer 56. The temperature of the air entering the inlet of the oxidizer can be monitored by means of a temperature control thermocouple 160. A further temperature sensor 162 can be mounted downstream of the catalyst to monitor the temperature of the exhaust leaving the outlet of the catalyst. The preferred catalyst is a ceramic honeycomb lattice type with 200 cells per square inch, the surface of which is platinum coated. The catalyst operates at 900 degrees F. in a preferred embodiment which operates at 30,000 feet/second space velocity. The catalyst is 95% efficient in reducing the volatile organic compounds to harmless materials such as carbon dioxide and water vapor.

The heated air leaving the catalyst enters a second inlet of the heat exchanger 144 where this air is used to preheat the VOC contaminated air passing through the other side of the heat exchanger. The cooled exhaust air then passes out of a second outlet of the heat exchanger to exhaust conduit 164 to exhaust stack 32' shown in dashed lines in FIG. 1. It will be understood that the same exhaust stack 32 can be used for both the thermal mode and the catalytic mode, it being necessary simply to detach the stack at its base by removing bolts and moving it to the other position. There can be mounted in the conduit 164 a further temperature sensor 166 to measure the temperature of the exhaust air passing through the stack.

Returning to FIGS. 1 and 2 of the drawings, it will be noted that the catalytic oxidizer and the heat exchanger are mounted in an insulated housing 168 that extends the width of the trailer. In a preferred embodiment the outside casing 170 of this housing is made of 16 gauge steel while an inner casing 172 is made of 16 gauge stainless steel sealed by welding. The insulation between the casing is 6 inches of mineral wool that should be rated for 1,250 degrees F. The insulation 174 can be made with three layers of 2 inch material with the seams overlapping.

The combustion chamber 46 can be made with a casing 176 of 3/16ths inch thick HRS with a lightweight castable refractory lining on the inside thereof producing a maximum outside skin temperature of 200 degrees F. The casing should be of all seal welded construction and painted with high temperature AL paint.

The stack 32, 32' in a preferred embodiment is made of 18 inch diameter 18 gauge stainless steel and has a height of about 6 feet. Preferably a protective screen 178 is arranged about the circumference of the stack.

It will be understood that natural gas or propane is supplied to the burner unit by means of a standard fuel gas train (not shown) constructed to both CFA standards and FM and IRI standards.

Figure 7:
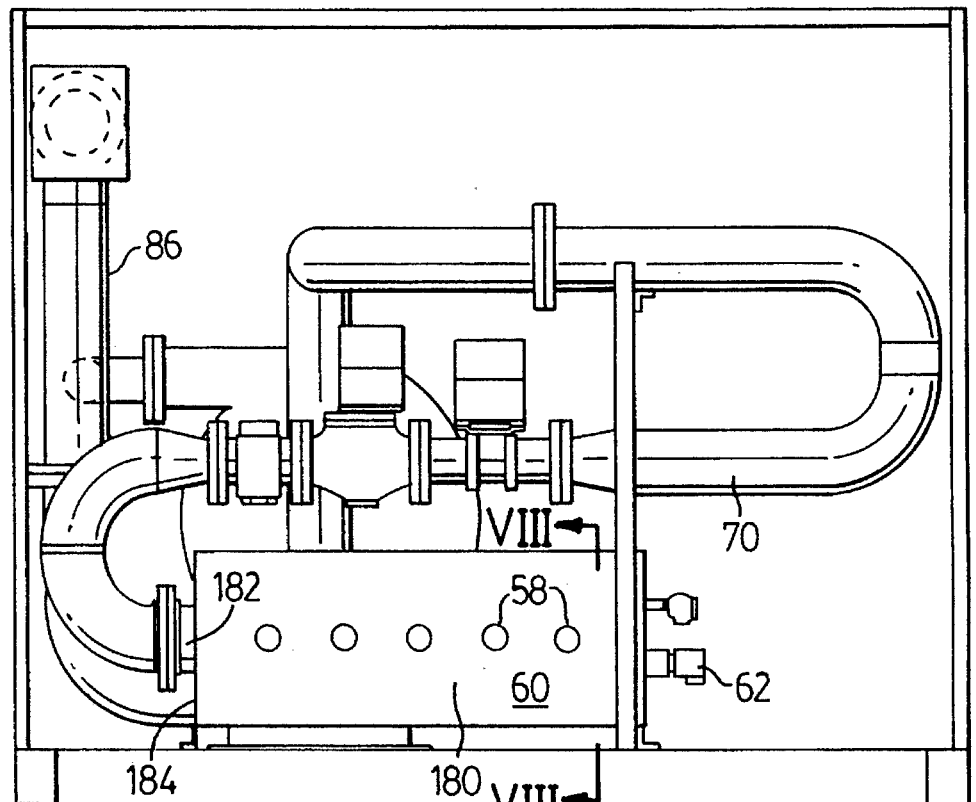
FIG. 7 is an end elevation of the trailer unit showing the condensation tank with the rear panels of the trailer unit removed for sake of illustration.

The construction of the condensation knock-out tank 60 will now be described with reference to FIGS. 7 and 8 of the drawings. In the illustrated embodiment there are five inlet pipes 58 which are connected to one side of a cylindrical side wall 180, the transverse cross-section of which can be seen from FIG. 8. The inlet pipes 58 are connected in such a manner that the VOC contaminated air as it enters the tank is forced to swirl around the inside of the cylindrical side wall 180 as indicated by the arrows A in FIG. 8. The swirling action causes water and water vapor to collect on the cylindrical side wall which generally is cooler than the incoming air and the condensed water settles to the bottom of the tank where it can be removed from time to time by means of a drain 63 shown in FIGS. 1 and 3. The large pipe 70, which can be 4 inches in diameter, is connected to a circular outlet 182 of the tank. This outlet is located centrally in an end wall 184 of the tank above the bottom of the tank.

Figure 8:
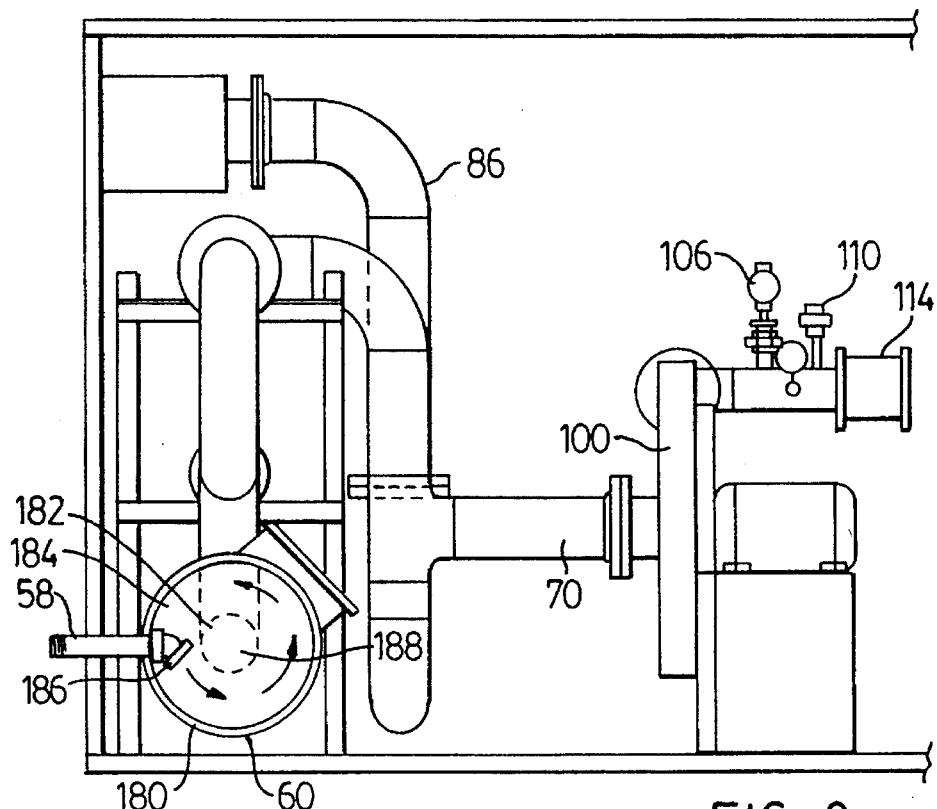
FIG. 8 is a side elevation of the rear portion of the trailer unit showing the condensation unit in cross-section along the line VIII—VIII of FIG. 7.

The preferred construction for the inlet pipes 58 is shown in FIG. 8. In particular, each pipe is fitted with a 45 degree elbow 186 on the inside of the tank. In this way, the pipes deliver the VOC contaminated air along a tangential flow line relative to the longitudinal center line at 188 of the tank. In one preferred embodiment, the condensation tank has an outside diameter of 18 inches and a length of 48 inches.

Figure 5:
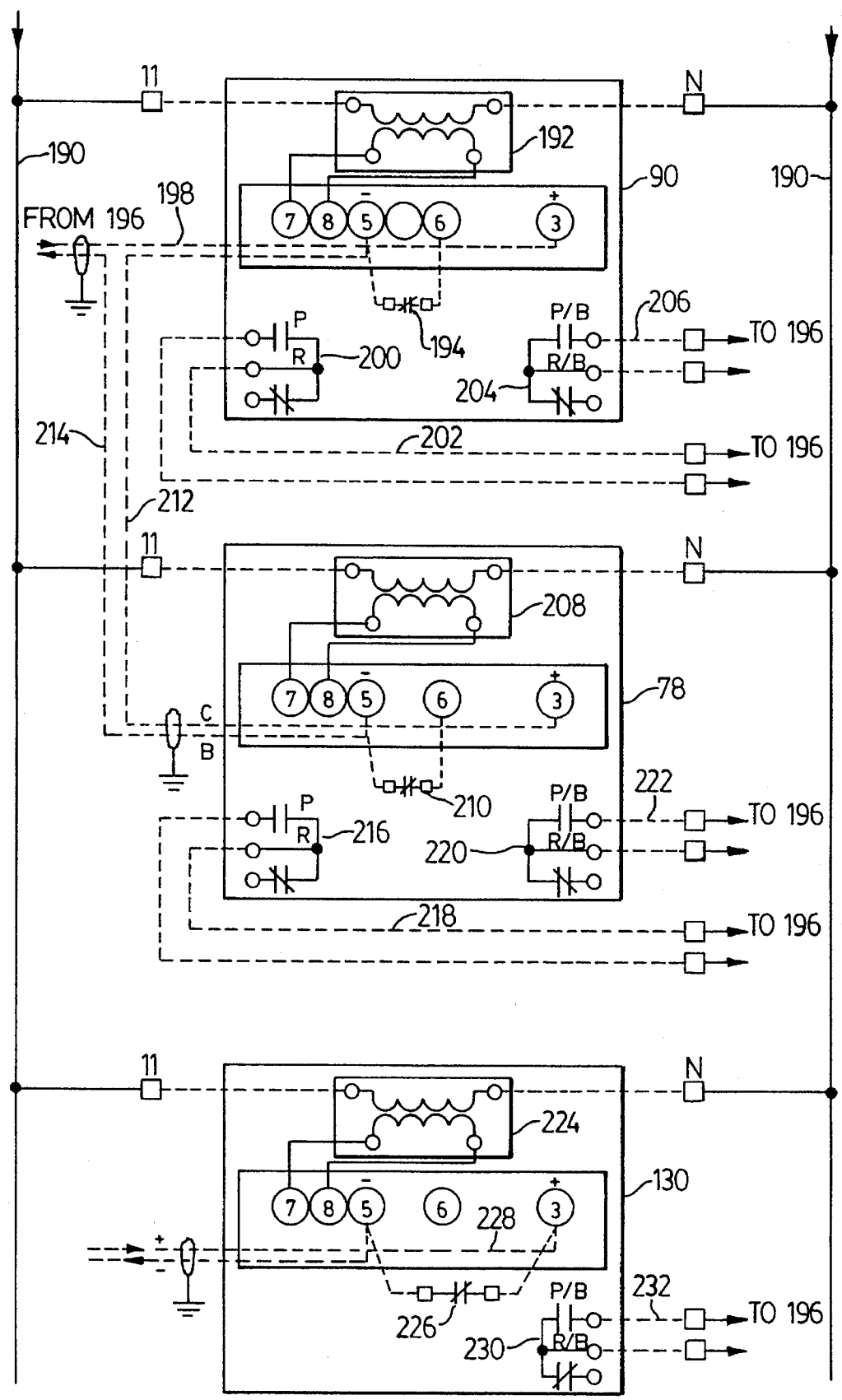
FIG. 5 is an electrical circuit diagram showing the electrical circuits for operation of the fresh air damper, the vapor control valve and the gas control valve.
Figure 6:
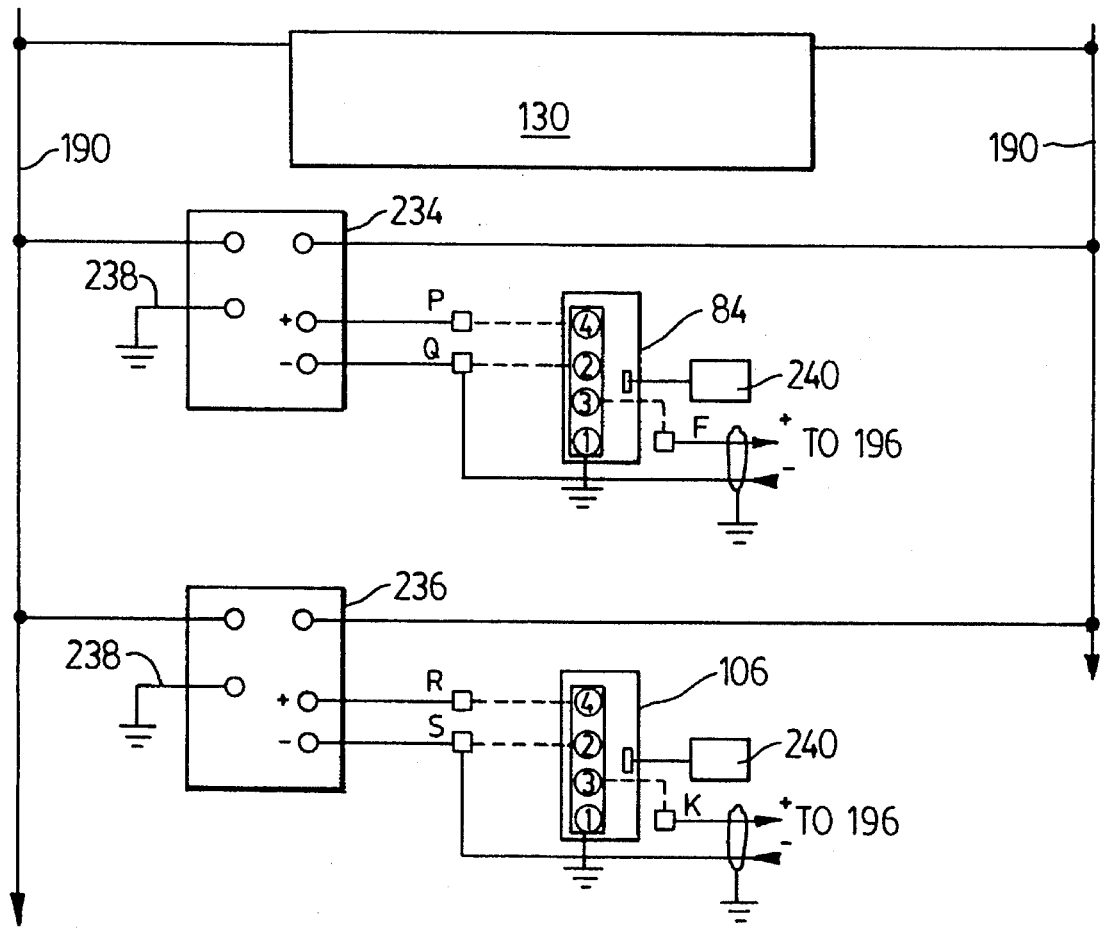
FIG. 6 is a further circuit diagram showing the electrical circuitry for the two instruments for measuring the low explosive limit (LEL) of the VOC contaminated air flowing into the converter unit.

Turning now to the wiring diagram of FIGS. 5 and 6, it will first be understood that FIG. 6 is a continuation of FIG. 5 with the electrical components of FIG. 6 being connected at the bottom end of the power supply line shown in FIG. 5. A 120 volt power supply line is indicated on the right and left sides at 190. At the top of FIG. 5 it is connected via terminal 11 to fresh air damper modulation motor 90. The motor includes a transformer unit 192 that converts the 120 volt AC current provided to 24 volts. The 24 volt current is connected to wiring terminals 7 and 8 of the terminal board. Connected to terminals 5 and 6 is a relay 194 which is deenergized and closed when the damper is fully open. The damper is open at the beginning of the start-up of the unit. A control signal of 4 to 20 milliamps from the programmable logic controller 196 passes along line 198 to terminal 3. A motor cam switch 200 for the motor 90 has connected thereto a line 202 which is connected to the programmable logic controller (hereinafter referred to as the PLC) 196. A second motor cam switch 204 has two terminals connected by line 206 to the PLC 196.

In the center of FIG. 5 is shown the vapor control valve modulation motor 78 which also is equipped with a transformer converting 120 AC current to 24 volts. This transformer 208 is connected on the 24 volt side to a terminal board as shown. A relay 210, which is closed at the beginning of start-up, is connected to terminals 5 and 6. The valve 76 (shown in FIG. 3) is closed at the beginning of the start-up of the unit. Terminal 3 is connected by line 212 to terminal 5 of the motor 90. The terminal 5 of motor 78 is connected to the PLC by line 214. Motor cam switch 216 is connected by line 218 to the PLC. Another motor cam switch 220 is connected by line 222 to the PLC. It will be understood by those skilled in the art that the modulation motors 78 and 90 operate in opposing fashion in order to control the VOC content of the incoming contaminated air that flows through the pipe 70. Thus, after start-up of the unit, when the fresh air damper is fully closed, the vapor control valve 76 will be fully open and visa versa.

At the bottom of FIG. 5 is shown the gas control valve modulation motor 130 equipped with a transformer 224 the same as those in the other two motors. It also has a relay 226 connected to terminals 3 and 5 which is closed, along with the valve 132, at the beginning of the start-up of the unit (that is the relay is deenergized). Terminal 3 is also connected to line 228 which runs from the PLC which controls this motor. The motor 130 has a single motor cam switch 230 having terminals connected by line 232 to the PLC.

FIG. 6 shows the 120 volt power supply line 190 connected to the LEL sensors 84 and 106. Each of these sensors is supplied power respectively by DC power supplies 234 and 236, each of which is connected to the ground at 238. The detector assembly for each sensor is indicated at 240. The terminal board for each sensor is connected to the PLC 196 as shown.

Operation in Thermal Mode

In the thermal mode of operation, which will generally be used initially because of the high VOC levels in the contaminated air, the detachable portion of the pipe conduit 154 is disconnected. Preferably the ductwork inlet of the catalytic converter is covered with a suitable cover plate (not shown) to prevent rain from getting into the converter. The stack 32 is connected at the top of the combustion chamber. The by-pass valves 142 and 150 are closed and the by-pass valve 122 is opened. A main manual gas shut-off valve in the gas train is then opened along with a main burner firing valve 242. The pilot valves of the gas train are also opened. The high temperature limit switch for the combustion chamber can be set at 1,700 degrees F.. Then the booster blower 100 is started and the pipe system is purged for about 60 seconds or more. After purging, the relay 226 of the motor 130 is energized to allow the flow of gas and the combustion air and the burner 124 can be ignited. The burner after it is turned on will start to ramp to the set point temperature of 1,600 degrees F. In the preferred embodiment, the temperature is increased at the rate of 20 degrees F. per minute to avoid combustion chamber shock. Only when the temperature of the combustion chamber has reached 1,600 degrees F. is the relay 210 energized and the vapor auto shut off valve 74 opened. The suction then starts and the VOC contaminated air is pumped into the combustion chamber and converted to clean air. The system can be operated either automatically by means of the PLC 196 or manually. In the preferred embodiment, the PLC is a Honeywell Series 9000 PLC.

Catalytic Mode of Operation

This mode of operation which is more energy efficient will generally be used after the thermal mode has been used for some time and the level of VOC in the contaminated air has dropped to a sufficiently low level. To convert from the thermal mode to the catalytic mode, the thermal stack 32 is detached from the outlet at the top of the combustion chamber. The conduit 154 is then connected by installing the elbow 158 and then the by-pass valves 142 and 150 are opened. The heat exchanger by-pass valve 122 is closed.

The gas supply to the main burner 124 is turned on in the usual manner and, with the power on, the high temperature limit of the combustion chamber is set at 1,200 degrees F. As in the thermal mode, the fan is first started and the purging operation of the pipes is carried out for about 60 seconds. The burner 124 is then started and it is then ramped to a set point temperature of 900 degrees F. When the temperature in the combustion chamber has reached 900 degrees F., the automatic shut off valve 74 is opened, suction starts and the VOC contaminated air is blown into the combustion chamber and then to the catalytic oxidizer for conversion to clean air.

It will be understood by those skilled in the art that high temperature gaskets should be installed in a known manner between all of the connecting flanges in the ductwork between the combustion chamber and the catalytic converter. Also, the trailer should be grounded by a wire extending to a grounding rod if the power supply does not have a ground wire available. All airflow sensors and transmitters should be checked for accuracy after transit of the equipment.

As will be seen from the above description, the present converter unit is constructed to be highly efficient and can be used to cleanse contaminated air having a wide range of levels of VOC therein. Results of independent testing on the described converter unit shows that the unit produces a discharge exhaust to the atmosphere well within limits acceptable to present day emission standards. Furthermore, the unit is quite safe in its operation as it is continually monitored and controlled by the LEL sensors and monitor. The data gathered by this monitor feeds its electrical signal back to the PLC where it can be analyzed and recorded.

In the preferred embodiment the control parameters in the PLC permit the converter unit to operate in the thermal mode with a VOC LEL of 60% and in the catalyst mode with a VOC LEL of 16.5%. Because of the capability of blending in fresh air to lower the existing LEL level, the converter unit is highly flexible and capable of treating contaminated air in the full LEL range from 100% to 1% efficiently.

Various modifications and changes to the described preferred embodiment of the converter unit will be apparent to those skilled in this art. Accordingly, all such modifications and changes as fall within the scope of the appended claims are intended to be part of this invention.

We therefore claim:

1. An oxidation apparatus for cleansing air contaminated by volatile organic compounds (VOC) in an exothermic reaction, said apparatus comprising:

piping means connectible to a source of VOC contaminated air;

means for oxidizing said volatile organic compounds with an exothermic reaction in order to remove same from said VOC contaminated air, said oxidizing means having an inlet connected to said piping means and an outlet for exhaust air, said oxidizing means including first oxidizing means comprising a combustion chamber, a burner mounted to said combustion chamber, and means for controlling the temperature in said combustion chamber during a thermal mode of operation and during a catalytic mode of operation, and further including a second oxidizing means comprising a separate catalytic oxidizer located outside of and away from said combustion chamber, having an outlet to atmosphere for exhaust and being used for said catalytic mode of operation, an inlet of said catalytic oxidizer being connected by means of an elongate pipe to an outlet of said combustion chamber, which is also used to heat the VOC contaminated air before this air is conducted to said catalytic oxidizer during the catalytic mode of operation, said temperature controlling means causing said burner to heat said combustion chamber to a first temperature for said catalytic mode of operation and to a second, different temperature for said thermal mode of operation, said second temperature being substantially more than said first temperature;

a fresh air conduit connected to said piping means at a pipe joint located along said piping means;

means for introducing a selected amount of fresh air into said piping means through said conduit so that the fresh air is mixed with said VOC contaminated air flowing through said piping means, said introducing means including an airflow control damper and a motor for operating said damper;

first means for measuring the low explosive limit (LEL) of the VOC contaminated air flowing through said piping means and producing a first electrical signal indicative thereof, said first measuring means being connected to said piping means between said source of VOC contaminated air and said pipe joint;

second means for measuring the LEL of the VOC contaminated air connected to said piping means between said pipe joint and said oxidizing means and producing a further electrical signal indicative thereof; and electrical control means for controlling said fresh air introducing means on the basis of said first and further electrical signals, said control means being electrically connected to said first and second measuring means and said fresh air introducing means.

2. An oxidation apparatus according to claim 1, wherein said electrical control means is programmed to control the low explosive limit of VOC contaminated air entering said burner so that this limit is a maximum of 60% during the thermal mode of operation.

3. An oxidation apparatus according to claim 2 wherein said electrical control means is programmed to control the low explosive limit of VOC contaminated air entering said catalytic oxidizer so that this limit is a maximum of 16.5% during the catalytic mode of operation.

4. An oxidation apparatus according to claim 3 wherein at least part of said elongate pipe is detachable from said combustion chamber.

5. An oxidation apparatus according to claim 1 wherein at least a section of said elongate pipe is detachable from said outlet of said combustion chamber and said apparatus includes an elongate exhaust stack connectible to said outlet of said combustion chamber, said exhaust stack being used only during said thermal mode of operation.

6. An oxidation apparatus according to claim 1 including a separate heat exchanger for preheating said VOC contaminated air connected to said piping means, said heat exchanger having an outlet for said VOC contaminated air connected by a conduit to said combustion chamber, wherein said first oxidizing means further heats the preheated VOC contaminated air during the catalytic mode of operation and said heat exchanger is also connected to said outlet of the catalytic oxidizer, heated air from said catalytic oxidizer being used to preheat said VOC contaminated air.

7. An oxidation apparatus according to claim 6 wherein said catalytic oxidizer and said heat exchanger are both mounted in an insulated housing that is separated from and spaced apart from said combustion chamber.

8. An oxidation apparatus according to claim 6 including valve means for shutting off flow of VOC contaminated air through said heat exchanger during said thermal mode of operation, said piping means delivering said VOC contaminated air directly to said combustion chamber and by-passing said heat exchanger during said thermal mode of operation.

9. An oxidation apparatus according to claim 1 wherein said burner has a set operating temperature of at least 1600 degrees F. for said thermal mode of operation.

10. An oxidation apparatus for cleansing air contaminated by volatile organic compounds (VOC) in an exothermic reaction, said apparatus comprising:

piping means connectible to a source of VOC contaminated air;

means for oxidizing said volatile organic compounds with an exothermic reaction in order to remove same from said VOC contaminated air, said oxidizing means having an inlet connected to said piping means and an outlet for exhaust air, said oxidizing means comprising a combustion chamber, a burner mounted to said combustion chamber, and a separate catalytic oxidizer located outside of and away from said combustion chamber and having an outlet to atmosphere for exhaust, said catalytic oxidizer being used for catalytic mode oxidation and having an inlet connected by means of an elongate pipe to an outlet of said combustion chamber, and means for controlling the temperature in said combustion chamber during a thermal mode of operation thereof and during said catalytic mode oxidation, said combustion chamber also being used to heat said VOC contaminated air before this air is conducted to said catalytic oxidizer, said temperature controlling means causing said burner to heat said combustion chamber to a first temperature for said catalytic mode oxidation and to a second, substantially greater temperature for said thermal mode of operation, a fresh air conduit connected to said piping means at a pipe joint located along said piping means;

means for introducing a selected amount of fresh air into said piping means through said conduit so that said fresh air is mixed with said VOC contaminated air flowing through said piping means, said introducing means including an airflow control damper and a motor for operating said damper;

means for measuring the low explosive limit (LEL) of the VOC contaminant air flowing through said piping means and producing an electrical signal indicative thereof, said measuring means including an LEL measuring device connected to said piping means between said source of VOC contaminated air and said pipe joint;

electrical control means for controlling said fresh air introducing means on the basis of said electrical signal, said control means being electrically connected to both said measuring means and said fresh air introducing means.

11. An oxidation apparatus according to claim 10 wherein said electrical control means is programmed to control the low explosive limit of VOC contiminated air entering said catalytic oxidizer so this limit is a maximum of 16.5% during said catalytic mode oxidation.

12. An oxidation apparatus according to claim 10 wherein said electrical control means is programmed to control the low explosive limit of VOC contaminated air entering said burner so this limit is a maximum of 60% during the thermal mode of operation.

13. An oxidation apparatus according to claim 10 including conduit means, at least part of which is detachable, for connecting said combustion chamber to said inlet of said catalytic oxidizer in order to conduct heated VOC contaminated air from the combustion chamber to said catalytic oxidizer.

* * * * *